May 2, 1933. W. A. DARRAH 1,906,447
PROCESS OF TREATING AND UTILIZING GASES AND EQUIPMENT THEREFOR
Filed Jan. 2, 1930
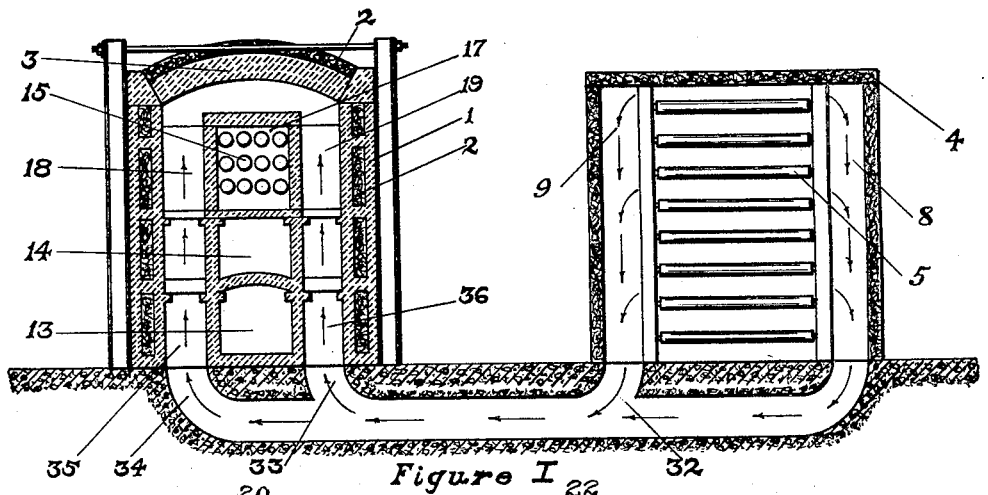
Figure I
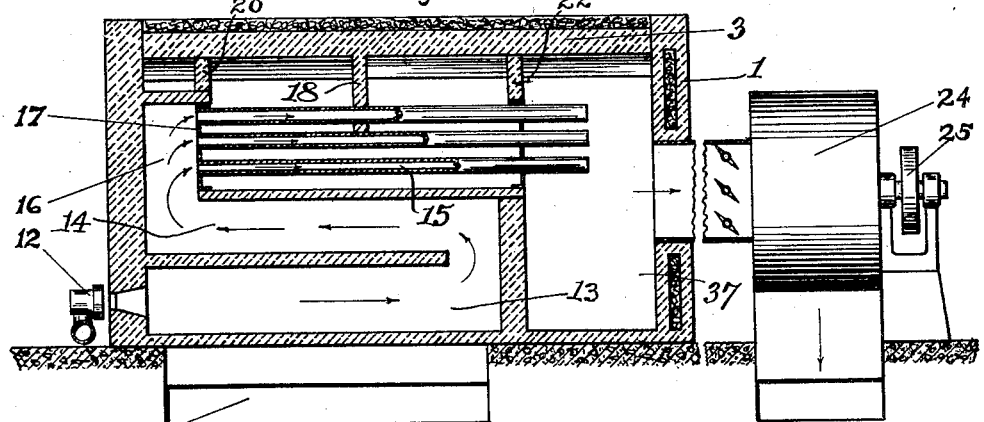
Figure II
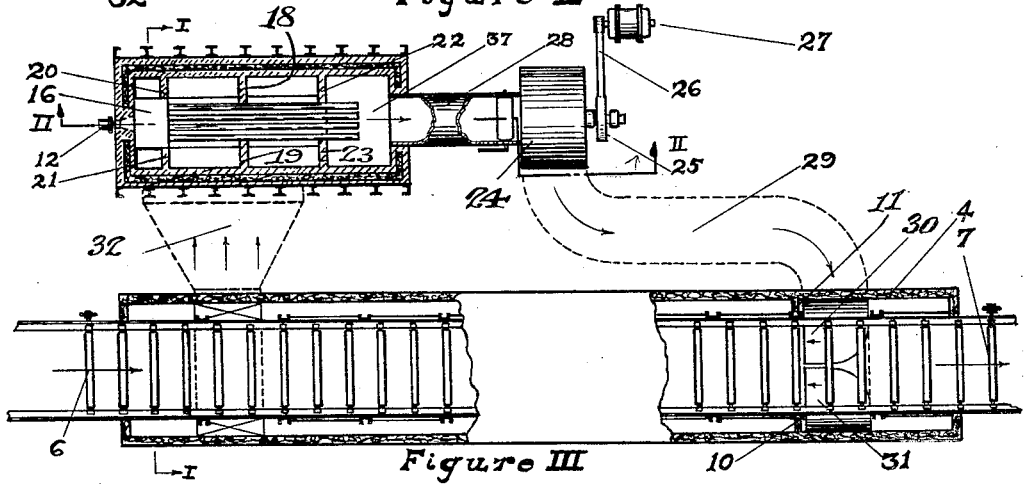
Figure III
Inventor.
William A. Darrah.

Patented May 2, 1933

1,906,447

UNITED STATES PATENT OFFICE

WILLIAM A. DARRAH, OF CHICAGO, ILLINOIS

PROCESS OF TREATING AND UTILIZING GASES AND EQUIPMENT THEREFOR

Application filed January 2, 1930. Serial No. 418,040.

This invention relates to processes and methods for treating and utilizing gases particularly products of combustion and the equipment necessary for such treatment or application.

The object of my invention is to utilize gases which may contain products of combustion and various chemical compounds without incurring objectionable results owing to the nature of these gases. I may utilize these gases in baking, drying, heating, heat treating and similar applications and the gases used may consist of air, carbon dioxide, etc. or products of combustion mixed with air or undiluted.

In order to explain the operation of my invention I will select the specific case in which the circulating gases contain products of combustion with air and possibly water vapor and will assume that sulphur is the element which subsequently causes difficulty in utilizing the products of combustion.

It should be understood that while my description specifically relates to the case of sulphur in products of combustion or the so-called flue gases yet similar difficulties may result from the presence of compounds of nitrogen, selenium, tellurium and many other materials. It is well known that sulphur when oxidized may form either the dioxide or the tri-oxide depending upon the temperatures of oxidation, whether or not catalysts are present, time elapsing between oxidation and the interval of cooling and other factors.

In the case of drying such materials as gypsum board, wallboard, paper, fiber board and other similar substances particularly those high in cellulose, starch, dextrine and related products, it is desirable to circulate a quantity of heated gases over the article from which the water is being removed. If the gases contain products of combustion from coal, gas or oil containing large amounts of sulphur it has been found that a very troublesome discoloration of the surface results. Many attempts have been made to overcome this discoloration but in general without success, as far as I am aware, so that where appreciable quantities of sulphur are present it is customary to separate the products of combustion from the circulating gases by means of tubes or other surfaces which serve as heat interchangers. This results in a considerable loss of heat in the stack gases and in an increased cost of equipment for heat interchangers. This also reduces the flexibility and capacity of the equipment.

One of the objects of my invention is to provide means for overcoming this limitation and to make it possible to intermix the products of combustion even though they contain considerable amounts of sulphur with the circulating gases thus getting higher economy of operation, lower cost of equipment and other obvious advantages.

In studying this problem I have found that the presence of large amounts of sulphur dioxide in the circulating gases has a relatively small effect upon the material being treated. While the presence of even relatively small amounts of sulphur tri-oxide will cause the blackening which has previously been known. In other words, my experiments have indicated that the degree of oxidation of the sulphur controlled to a large extent its effect upon the surface. As a theory which seems reasonable, I am of the opinion that sulphur tri-oxide when brought into contact with a wet cool surface, condenses forming with the water present sulphuric acid which when the proper concentration and temperature is reached, gives a will known blackening effect.

On the other hand, in the case of sulphur dioxide this material may condense on the surface of the board, but sulphurous acid is formed which not only does not darken the board but may under certain conditions, serve as a bleaching agent.

On observing this phenomenon I have therefore devised means for converting the sulphur tri-oxide which is present in products of combustion to sulphur dioxide and have found that when this step is taken considerable amounts of sulphur may be present in the fuel without seriously affecting the material being dried. My invention, therefore, covers not only a method of successfully using products of combustion high in sulphur, but also means for converting the form of the sulphur oxide into one which is comparatively harmless.

I wish it to be distinctly understood that while this discussion refers specifically to sulphur and its oxides yet similar means may be utilized in the case of oxides of nitrogen, selenium and other materials which occasionally contaminate fuels.

I have found that in the oxidation of sulphur under the conditions which exist in an ordinary combustion chamber, considerable quantities of both the dioxide and the tri-oxide are simultaneously produced. I have also found that at high temperatures in the presence of an excess of oxygen which practically always exists when fuel is burned completely, the dioxide may be converted to the tri-oxide or the reaction may be reversed. The higher the temperature in general the more rapid the conversion in either direction.

I have also found that as a result of this fact a rapid cooling of intensely hot products of combustion results in an increased percentage of sulphur tri-oxide and a reduced percentage of sulphur dioxide. Conversely a slow rate of cooling results in an increase in the percentage of sulphur dioxide and a reduction in the percentage of sulphur tri-oxide.

I have also found that if the gases are cooled in contact with a metal surface such as iron, iron alloys, etc., the percentage of sulphur tri-oxide is still further reduced with a corresponding increase in the percentage of sulphur dioxide.

Utilizing the results of these discoveries, I have therefore devised means for burning fuel and for subjecting the products of combustion to a relatively gradual cooling, preferably in contact with metal surfaces which are cooler than the gases themselves.

Referring now to the drawing:

Figure 1 shows a vertical elevation in section across my furnace and dryer taken along the lines I—I, of Figure 3.

Figure 2 shows a longitudinal section of the vertical elevation. Figure 2 is taken on section line II—II, of Figure 3.

Figure 3 shows a plan view partly in section of one form of my furnace applied to the specific case of a dryer.

It is understood that the drawings are diagrammatic and illustrate merely one way of applying the elements of my invention.

In the drawing 1 represents a shell or housing which may be formed of brick with a layer of insulation 2 and covered by a roof 3. A dryer housing 4 is shown located beside the heater housing 1. The dryer may be of the roller type in which a series of live driven rolls indicated by 5 serve to convey the material. On the other hand, I may use a series of cars, trays, chains or other conveying device, or I may place the material to be dried into the dryer by hand and remove it as desired. These obvious modifications all fall within the scope of my invention. For the purposes of illustration I have shown a roller dryer provided with a series of feed rolls 6 at the entering end and a series of discharge rolls 7 at the leaving end. For ease in delivering the circulating hot products of combustion and air I provide longitudinal ducts 8 and 9 along the sides of the dryer and in order to control the flow of circulating gases I divide these ducts at an intermediate portion by partitions 10 and 11 respectively. A fuel supply device 12 is located near the end of the combustion chamber 13 in heater housing 1 and serves to supply the necessary fuel and air. This may be taken to represent a gas burner, oil burner, powdered coal burner or other desired device as obviously my invention is not restricted to any particular type of burner. In order to obtain durability and a heat transfer I prefer to construct combustion chamber 13 from a refractory material having a fairly good heat conductivity. Some materials I have found satisfactory are silicon carbide, aluminum oxide, heat resisting alloys, such as nickel chromium alloys and similar products although I have used ordinary fire clay in certain cases with satisfactory results. For ease of mechanical construction in order to avoid too lengthy a device I have found it convenient to build the combustion chamber in two chambers. A lower portion is indicated by 13 and an upper portion indicated by 14. As a further convenient means for cooling the products of combustion in contact with metal I provide a series of metal tubes 15 connected to the combustion chamber by means of a flue 16. As a convenient means of construction I apply a tube sheet 17 into which one end of the tubes may be fastened. The tubes may be supported in any convenient manner and the opposite end from the tube sheet is left open. A series of baffles indicated by 18, 19, 20, 21, 22 and 23 are provided to direct the circulating atmosphere within the heater housing 1 around and over the tubes. It should be understood that where I refer to tubes I do not necessarily mean a round or cylindrical device as I may use a series of rectangular or flat ducts or any other equivalent structure which permits intimate contact with the products of combustion on one side and the circulating gases on the other, therefore, providing means of cooling products of combustion.

A circulating fan or blower 24 driven by pulley 25, belt 26 and motor 27 serves to draw the products of combustion and gases within housing 1 through duct 28 and deliver them to duct 29. These circulating gases then pass through nozzles 30 and 31 and flow between the layers of rollers 6 being brought into close contact with the materials being dried. The gases then flow in the direction shown by the arrows leaving dryer 4 and entering return duct 32. They then pass through branches 33 and 34 into air spaces 35 and 36 on each side of the combustion chamber. Gases then pass upward over the surface of the combustion chamber withdrawing a portion of heat from the combustion chamber.

These gases continue to travel and pass over and around tubes 15 thus removing heat from the surface of these tubes. The gases finally travel forward along the length of heater 1 and around the tubes until in mixing chamber 37 they are drawn into the products of combustion leaving tubes 15. No effort is made to thoroughly mix the products of combustion leaving tubes 15 with the gases which return outside the tubes as their temperatures are substantially equal and a variation in chemical composition is of no particular importance. The gases when mixed then contain portions of the products of combustion, pass through duct 28 into fan 24 and begin the cycle again.

The excess of gases, due to the continuous addition of products of combustion and the water vapor formed in the drying operation may escape from the ends of the dryer or through stacks or ducts as desired, not shown.

Referring now to the operation of this device it will be noted that the combustible material delivered into combustion chamber 13 ignites and a considerable quantity of heat is withdrawn through the walls of combustion chamber 13 and transmitted to the circulating gases outside these walls. The cooler products of combustion then travel into space 14 above combustion chamber 13 and give up still more of their heat content to the circulating gases outside the combustion chamber. The products of combustion next pass through the flue 16 and then through tubes 15 where they are cooled to the desired temperature in contact with the surface of the tubes and ample opportunity is given for sulphur tri-oxide to be reduced to sulphur dioxide both by the gradual reduction in temperature and by the contact with the metal surface which acts as a so-called negative catalyzer.

It will be evident, therefore, that the device I have provided offers means for burning the fuel, reducing the temperature of the products of combustion at a pre-determined rate and while doing so bringing said products of combustion into contact with a surface which acts as a negative catalyzer.

In some cases I have found it an advantage to place within the ducts or tubes 15 a series of widely separated surfaces as for example a tangle of wire or the equivalent, so that the products of combustion are all brought into close contact with a metal surface. In this case the wire may be made from a heat resisting alloy although the material from which it is formed will of course depend on the temperature to which it is subjected. It should be understood that I may or may not use the tangle of wire or other means such as metallic wool, etc.

While I have disclosed one specific form in which my invention may be embodied, I wish it to be clearly understood that many changes may be made in the mechanical arrangement, size, shape and disposition of the various parts without departing from the spirit of my invention.

It will be noted that my invention provides means for cooling products of combustion in more or less continuous successive stages. The degree of cooling and the rate of cooling as well as the exact means employed will of course depend on the results which must be obtained. For example a flame which would ordinarily produce relatively low temperature as for example a producer gas flame would require less cooling and would even for the same percentage of sulphur ordinarily contain lower quantities of sulphur tri-oxide. On the other hand, a flame formed from heavy fuel oil would require careful treatment in order to commercially remove the effective sulphur tri-oxide. The process and the device which I have disclosed may be adapted to any of these conditions by those skilled in the art by properly proportioning the sizes, surfaces, materials and other conditions to meet the requirements of each individual case.

It should be understood that it is ordinarily unnecessary to reduce the temperature of the products of combustion down to the so-called room temperature. In many cases where these are reduced to 400 or 500° the desired commercial result is accomplished. I, therefore, do not restrict this invention to any particular scale of temperatures.

In using the term "negative catalyzer" I wish to specifically include all substances which have a tendency to break down the higher oxide compounds into other compounds. Many such materials are known and to recite the entire list would result in excessive extension of this application without accomplishing a useful purpose. Only a few specific cases of these negative catalyzers have been cited, but they are well known in the art. In addition to the metallic surfaces discussed I may also use such materials as lime, barium oxide and a wide range of oxides which at the temperatures discussed serve to accomplish the desired result. Certain of the materials specified are more useful in specific cases than others, but the nature of the gases to be treated, the nature of the impurities, the operating temperatures, permissible velocities and many other factors control the selection of the negative catalyzer.

Having now fully described my invention what I claim as new and wish to secure by Letters Patent in the United States is as follows:

1. The process of treating products of combustion containing acid forming oxides which consists in gradually reducing the temperature of said products of combustion in an oxidizing atmosphere and bringing said products of combustion into contact with a basic compound for accelerating the reduction of acid oxides to a lower form of oxide.

2. The process of treating hot gases which consists in reducing the temperature of said gases under oxidizing conditions while in contact with a basic oxide.

3. The process of treating hot gases containing acid forming oxides which consists in cooling said gases under oxidizing conditions in contact with an alkaline material.

4. The process of treating products of combustion containing gaseous sulphur compound which consists in cooling said products of combustion progressively in an oxidizing atmosphere and maintaining said products of combustion in contact with a material having an alkaline reaction for at least a portion of the cooling period.

5. The process of treating hot gases containing sulphur oxides which consists in cooling said gases progressively and maintaining said gases in an oxidizing atmosphere in contact with an iron containing alkaline surface for a portion of the cooling period.

6. The process of treating products of combustion containing gaseous compounds of sulphur which consists in cooling said products of combustion progressively in an oxidizing condition, maintaining said products of combustion in contact with lime during a portion of said cooling period and finally mixing said treated products of combustion with other gases.

7. The process of de-oxidizing hot gaseous acid forming compounds which consists in cooling said gaseous compounds progressively under oxidizing conditions and bringing said gaseous compounds in contact with lime during a portion of the cooling period.

8. The process of converting sulphur tri-oxide into sulphur dioxide which consists in subjecting a portion of hot gases containing said sulphur tri-oxide under oxidizing conditions to a progressive cooling under controlled conditions, in contact with basic material.

9. The process of converting sulphur tri-oxide into sulphur dioxide which consists in subjecting a portion of hot gases containing said sulphur tri-oxide to a progressive cooling under controlled temperature conditions in an oxidizing atmosphere and bringing said sulphur tri-oxide into contact with an alkaline material during a portion of said cooling period.

10. In the process of treating products of combustion containing gaseous sulphur compounds, the step of progressively cooling said products of combustion under oxidizing conditions while in contact with an alkaline material.

11. In the process of treating products of combustion containing gaseous sulphur compounds, the step of progressively cooling said products of combustion under oxidizing conditions while in contact with a metal surface, and an alkaline material.

12. A device for treating combustion gases which contain acid forming materials which consists of a housing, a combustion chamber within said housing, a burner device cooperating with said combustion chamber and an air passage in said housing, a cooling duct connected to said combustion chamber said cooling duct being formed for a portion of its length to support a solid alkaline material in contact with said gases to be treated.

13. A device for treating combustion gases containing acid forming material which consists of a housing, a combustion chamber within said housing a burner device cooperating with said combustion chamber and cooling duct connected to said combustion chamber, means for cooling said duct by circulating gases and means for supporting solid alkaline material in contact with said gases being treated and means for mixing said gases being treated with said circulating gases, and a gas moving device for removing treated gases from said housing.

14. A device for treating combustion gases containing sulphur compounds consisting of a housing, a combustion chamber within said housing, cooling ducts connected to said combustion chamber, means for supporting alkaline material in contact with said gases while being cooled and a passageway around said cooling ducts and communicating with an opening in said cooling ducts.

15. A device for treating gases which consists of a housing, a refractory combustion chamber within said housing, a burner cooperating therewith, a metallic cooling chamber connected to said combustion chamber and containing alkaline material passages around said cooling duct and communicating with said cooling duct, and means for removing said treating gases from said housing.

WILLIAM A. DARRAH.